United States Patent
Itzkowitz

(10) Patent No.: US 10,609,450 B2
(45) Date of Patent: Mar. 31, 2020

(54) METHOD FOR HANDS AND SPEECH-FREE CONTROL OF MEDIA PRESENTATIONS

(71) Applicant: Aaron Itzkowitz, Boynton Beach, FL (US)

(72) Inventor: Aaron Itzkowitz, Boynton Beach, FL (US)

(73) Assignee: JINGLZ INC, Boynton Beach, FL (US)

( * ) Notice: Subject to any disclaimer, the term of this patent is extended or adjusted under 35 U.S.C. 154(b) by 0 days.

(21) Appl. No.: 16/014,274

(22) Filed: Jun. 21, 2018

(65) Prior Publication Data

US 2019/0058918 A1    Feb. 21, 2019

Related U.S. Application Data

(60) Provisional application No. 62/545,722, filed on Aug. 15, 2017.

(51) Int. Cl.

| | |
|---|---|
| *H04H 60/33* | (2008.01) |
| *H04H 60/56* | (2008.01) |
| *H04N 21/442* | (2011.01) |
| *G06K 9/00* | (2006.01) |
| *H04N 21/4223* | (2011.01) |
| *H04N 21/466* | (2011.01) |
| *G06F 3/01* | (2006.01) |

(52) U.S. Cl.
CPC ....... *H04N 21/44218* (2013.01); *G06F 3/013* (2013.01); *G06K 9/00308* (2013.01); *H04N 21/4223* (2013.01); *H04N 21/4667* (2013.01)

(58) Field of Classification Search
CPC ......... H04N 21/44218; H04N 21/4223; H04N 21/4667; G06F 3/013; G06K 9/00308
See application file for complete search history.

(56) References Cited

U.S. PATENT DOCUMENTS

| | | | |
|---|---|---|---|
| 2006/0044479 A1* | 3/2006 | Heo ....................... | H04N 5/445 348/738 |
| 2012/0222058 A1* | 8/2012 | el Kaliouby ......... | H04N 21/251 725/10 |
| 2015/0208125 A1* | 7/2015 | Robinson ........... | H04N 21/4223 725/12 |
| 2017/0243055 A1* | 8/2017 | Naveh .................. | H04N 21/262 |

\* cited by examiner

*Primary Examiner* — Kyu Chae
(74) *Attorney, Agent, or Firm* — Mark C. Johnson; Johnson |Dalal

(57) ABSTRACT

The present invention is directed to a computer-implemented method and system for analyzing a user's facial responses to determine an appropriate progression of outputs. Such a system may comprise open-source or commonly-implemented facial recognition hardware and software on smartphones, tablets, or computers, and may interface with the media-playing hardware on such devices. The system may prompt for and respond to facial gestures that may be associated with an approving or disapproving response to such played media, and these responses may be recorded in a central server for data related to the individual and users in the aggregate. Such a system may further comprise eye-tracking hardware and software to ensure the viewer is actively viewing the media being played, and may automatically select and advance the played media based on the viewer's recorded preferences.

3 Claims, 9 Drawing Sheets

METHOD FOR HANDS AND SPEECH-FREE CONTROL OF MEDIA PRESENTATIONS

PRIORITY NOTICE

The present application is a non-provisional utility application and makes a claim of priority under 35 U.S.C. § 119(e) to prior provisional application 62/545,722 filed in the United States Patent and Trademark Office on Aug. 15, 2017.

TECHNICAL FIELD OF THE INVENTION

The present invention relates in general to data processing, and, more specifically, to a computer-implemented method and system for analyzing a user's facial responses to determine an appropriate progression of outputs.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Conventional video interfaces are limited either by requiring physical user input, such as a person's hand, which may be used to interact with an input device such as a mouse, keyboard, trackpad, or touchscreen, or speech recognition, which may either understand the words the person is saying or which may determine a person's emotional affect or mental state in order to determine approval or disapproval for the displayed content. In the case of the former, a user must have a hand free to interact with the input method, or, in the latter, must be able to speak clearly in order to interact with a media presentation. With emotional affect or mental state voice recognition, there may not be any background noises that may register a false positive reading. This is often impossible in public settings such as on public transportation, at public events, at fitness centers, or even while a third-party is talking to the user. Also, for speech recognition, an artificial intelligence system must be able to understand the speaker, which may be difficult to record if a media presentation is playing simultaneously on the same device.

It is known to have a system for reading facial expressions that may categorize such expressions into seven different primary categories, such categories including happiness, sadness, contempt, disgust, surprise, fear, and anger. Such expressions may be identified by measuring changes in movement of certain facial features, namely the corners of the mouth, the corners of the eyes, the vertical position of the eyebrows, the prominence of the cheeks, and the furrows of the forehead.

It is known to have a facial recognition software which may be used on a smartphone, tablet, or computer, and which may read a plurality of facial landmarks on a user's face. Such a software may use such facial landmarks to read the position of and changes in position of various facial muscles associated with facial expressions. Such a software may read facial expressions in still photos or may read facial expressions in real time. Such readings may be displayed on a chart of measured landmarks over time to determine a correlation with the movements of particular facial muscles and their association with specific facial expressions.

It is known to have a facial recognition software which may be used to determine a progression of video sequences based on a user's facial expressions. Such a software may include information on one or more of a group consisting of facial expressions, action units, head gestures, smiles, brow furrows, squints, lowered eyebrows, raised eyebrows, smirks, and attention. The physiological data may include one or more of electrodermal activity, heart rate, heart rate variability, skin temperature, and respiration. The method may further comprise inferring of mental states based on the mental state data which was collected. The mental states may include one of a group consisting of frustration, confusion, disappointment, hesitation, cognitive overload, focusing, being engaged, attending, boredom, exploration, confidence, trust, delight, valence, skepticism, and satisfaction. The playing of the first media presentation may be done on a mobile device and further comprising recording of facial images with the mobile device as part of the capturing of the mental state data. Such a system may be known as "Video recommendation based on affect" and is disclosed in U.S. patent application Ser. No. 13/406,068.

There is a need in the art for a computer-implemented method and system for analyzing a user's facial responses to determine an appropriate progression of outputs. Such a system may provide an alternate input means allowing users to view and control media presentations when the user's hands may be full or when the user's voice may be unrecognizable to the presenting device. Such a system may be implemented for advancing media presentations based on user facial expressions, which may be prompted or impromptu, and may further comprise an eye-tracking feature to ensure that a user is viewing the media presentations.

It is to these ends that the present invention has been developed.

BRIEF SUMMARY OF THE INVENTION

To minimize the limitations in the prior art, and to minimize other limitations that will be apparent upon reading and understanding the present specification, the present invention describes a computer-implemented method and system for analyzing a user's facial responses to determine an appropriate progression of outputs.

It is an objective of the present invention to provide a facial response system that may comprise facial recognition hardware.

It is another objective of the present invention to provide a facial response system that may further comprise facial recognition software.

It is another objective of the present invention to provide a facial response system that may further comprise eye-tracking hardware.

It is another objective of the present invention to provide a facial response system that may further comprise eye-tracking software.

It is another objective of the present invention to provide a facial response system that may further comprise a media database.

It is another objective of the present invention to provide a facial response system that may further comprise a media displaying device.

It is another objective of the present invention to provide a facial response system that may further comprise a database of user feedback.

It is another objective of the present invention to provide a facial response system that may advance video playback.

It is another objective of the present invention to provide a facial response system that may pause video playback.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The present invention relates generally to data processing, and, more specifically, to a computer-implemented method and system for analyzing a user's facial responses to determine an appropriate progression of outputs.

Figure 1:
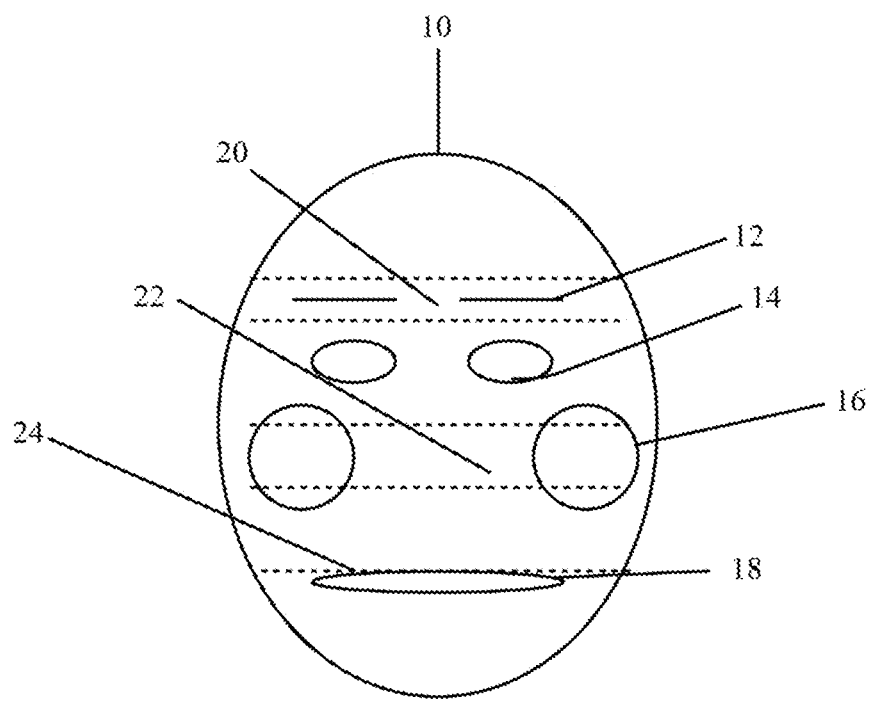
FIG. 1 illustrates a perspective view of the portions of a user's face associated with expression.

Referring now to the invention in more detail, in FIG. 1 there is shown the rough geometric shape of a person's face 10 with detail given to the eyebrows 12, eyes 14, cheeks 16, and mouth 18. The face can initially be detected using available open source facial recognition and detection systems. Such a system may comprise a camera device and camera software, and may be any system in common usage on the market or may be any system already commonly implemented on smartphones, tablets, and computers.

In further detail, still referring to FIG. 1, the person's face associated with the physical markers above has been arbitrarily divided into the following three sections: eyebrow furrows 20, raised cheeks 22, and raised or sunken corners of the mouth 24. The variables in these quadrants can be written into a conditional mathematical formula to determine the aggregate resulting facial response; either a frown or smile.

By way of a first example, a frown may be determined by a decreased measure on the baseline in quadrant 20, which may be associated with downturned eyebrows, combined with a decrease in quadrant 24, which may be associated with downturned corners of the mouth, with no change in quadrant 22.

By way of a second example, a smile may be determined by an increased measure on the baseline in quadrant 24, which may be associated with upturned corners of the mouth, combined with an increased measure on the baseline of quadrant 22, which may be associated with elevated cheeks, with no change in quadrant 20.

Figure 2:
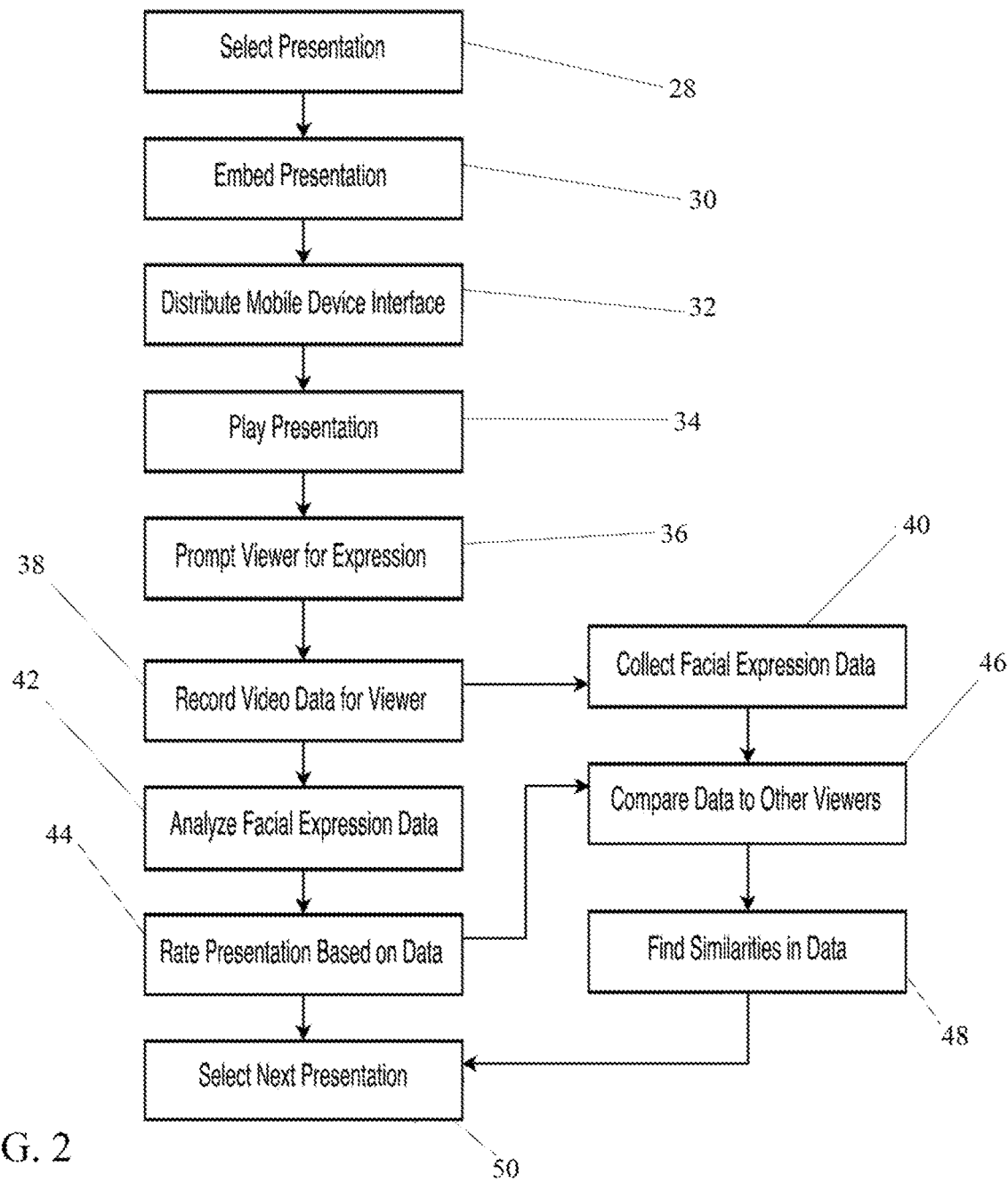
FIG. 2 schematically illustrates a flow diagram for displaying a media presentation.

FIG. 2 is a flow diagram for displaying a media presentation, which may specifically be a short video commercial. The presentation is selected to be viewed on a mobile device initially by the viewer 28. Next, the presentation is embedded to the video player of the device 30. The presentation is then distributed to the mobile device interface 32 and the presentation is played on the display screen of the device 34. Using open source eye-tracking and pupil-tracking software, the hardware and software combination may be able observe the viewer's eyes and determine, based on any appropriate or commonly-used measure, that the viewer is looking at the display screen. Once the application has determined that the viewer is looking directly at the screen, the viewer is promoted to elicit an intentional facial response such as a frown or smile showing approval or disapproval of the media presentation 36. If the viewer does not elicit a measurable response, then the viewer will be prompted for one again once the viewer's eye-gaze can be detected until a facial response is measured. Next, the viewer's facial response is recorded 38, measured, and transposed to data 40 via the mobile device's user-facing camera. If there is not enough lighting in the room to measure a response then the brightness of the screen on the mobile device may be controlled by the software, and the brightness may be increased to light up the person's face. The data is then analyzed using the conditional mathematical formula, as discussed in paragraphs [0035] and [0036] above, to determine if the person elicited a smile (approval response) or frown (disapproval response) 42. While that is occurring, the facial response data is transcribed to a shared computer database either located on a remote server or cloud based computer and compared and contrasted with other viewers to find similarities in facial expression responses 46. The viewer can be categorized in the database by demographics and the application can begin logging which media presentations the viewer likes or dislikes. That data can then be compared to other similar viewers in order to look for similarities between viewers 48. Once the presentation has been rated as either desirable or undesirable 44, through the input of either a smile or a frown, respectively, a new media presentation will be chosen based on the analyzed data of the viewer 50. The media presentation can be a video commercial or short video clip. The brevity of the video is crucial in keeping the viewer engaged and measuring facial response.

Figure 3:
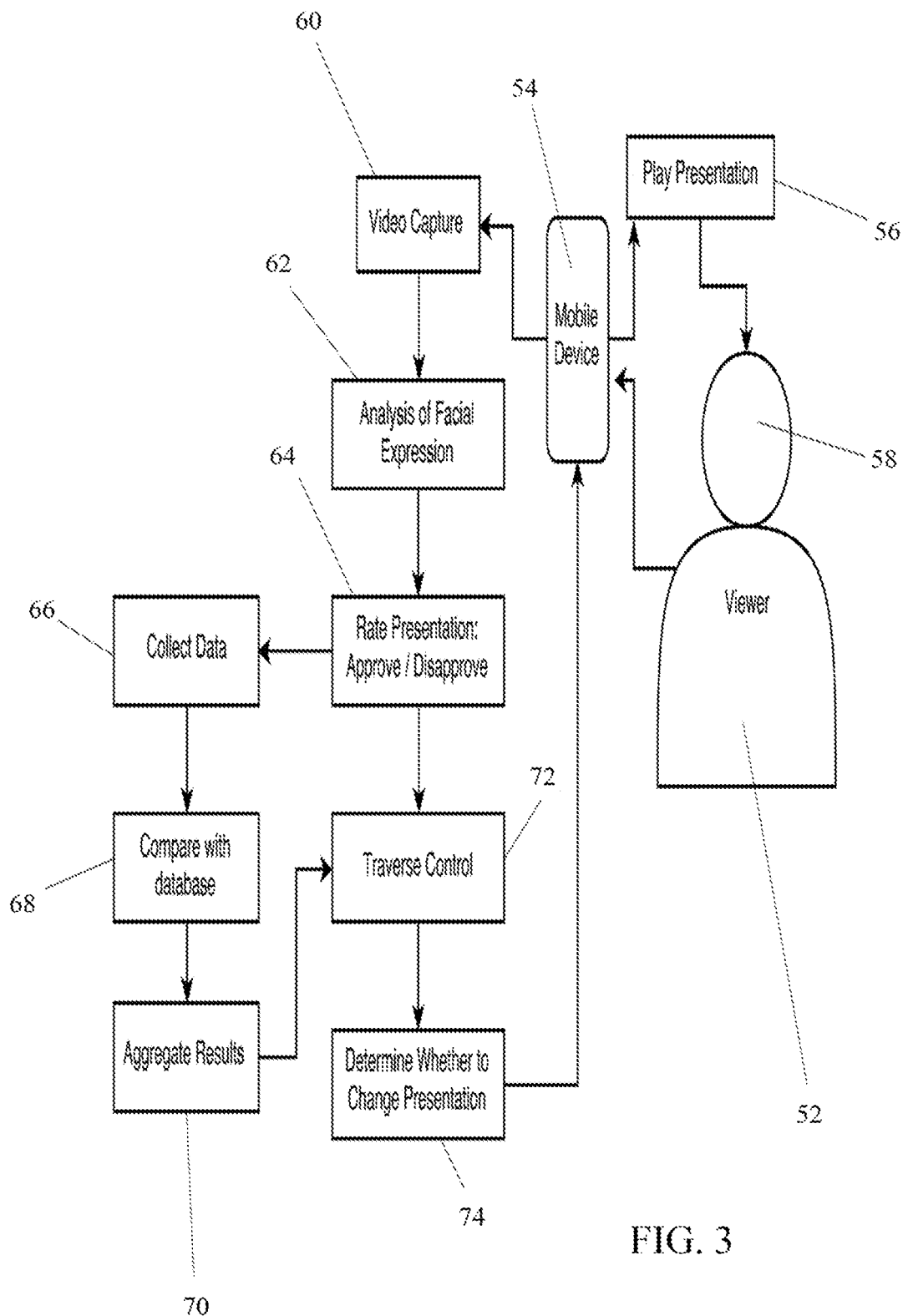
FIG. 3 schematically illustrates a system for capturing facial response data to a media presentation.

Referring now to FIG. 3, this is a system for capturing facial responses to a media presentation. The media presentation is selected to be viewed on a mobile device 54 initially by the viewer 58. Next, the mobile device's front facing camera records and captures the viewer's face 60, transposes the data, and analyzes the result as a facial expression 62. It then rates the purposeful response as either a smile (approval) or a frown (disapproval) 64. The mobile device then transcribes the data to a shared database on a remote computer server or cloud based server 66 for access by the same application on other devices. Then, the data can be compared and contrasted to other stored data for similar viewers 68, and the results can be collected and compiled 70. This allows the mobile device player to traverse control as a means of hands-free input 72 and determine whether to change the media presentation on its own 74. If the viewer expresses approval then the media presentation will not be changed, but if the viewer expresses disapproval then the media presentation will be accordingly changed and may be changed to a more desirable video based on the collected data available in the database.

Figure 4:
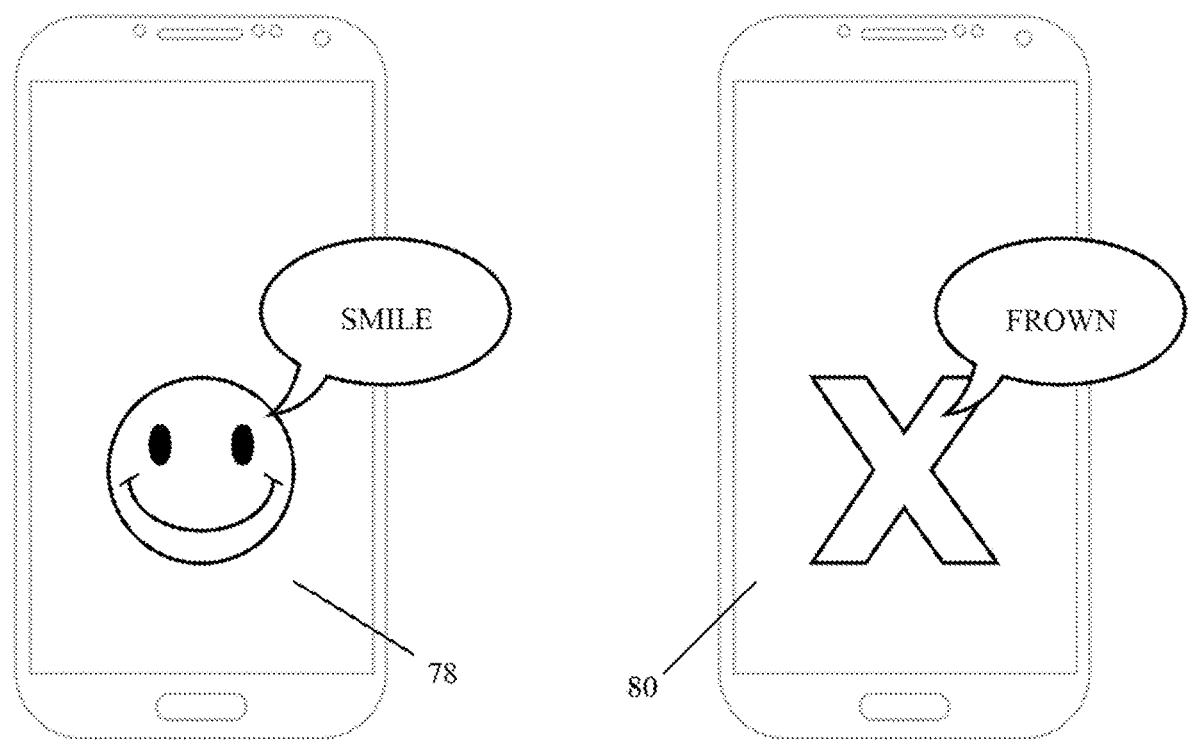
FIG. 4 illustrates a method for eliciting facial response to a media presentation for recorded video user input via a forward facing mobile device camera.

Referring now to FIG. 4, this is method for prompting facial response from recorded video user input via a mobile device's user-facing camera. Using open source eye-tracking and pupil-tracking software, once the application has determined that the viewer is looking directly at the screen during the presentation playback, the viewer will be prompted to either smile for approval 78 or frown for disapproval 80. This Figure is for illustrative purposes only and should not be seen as limiting the graphical design. If the viewer does not elicit a measurable response, then the viewer will be prompted for one again once the application is able to reacquire eye-gaze. If there is not enough lighting in the room to measure a response then the brightness of the screen on the mobile device can be increased to light up the person's face. In one embodiment, the prompt could be a small gray-scale icon appearing in a corner of the screen that is superimposed on top of the video that is playing, similar to a watermark or popup.

Figure 5:
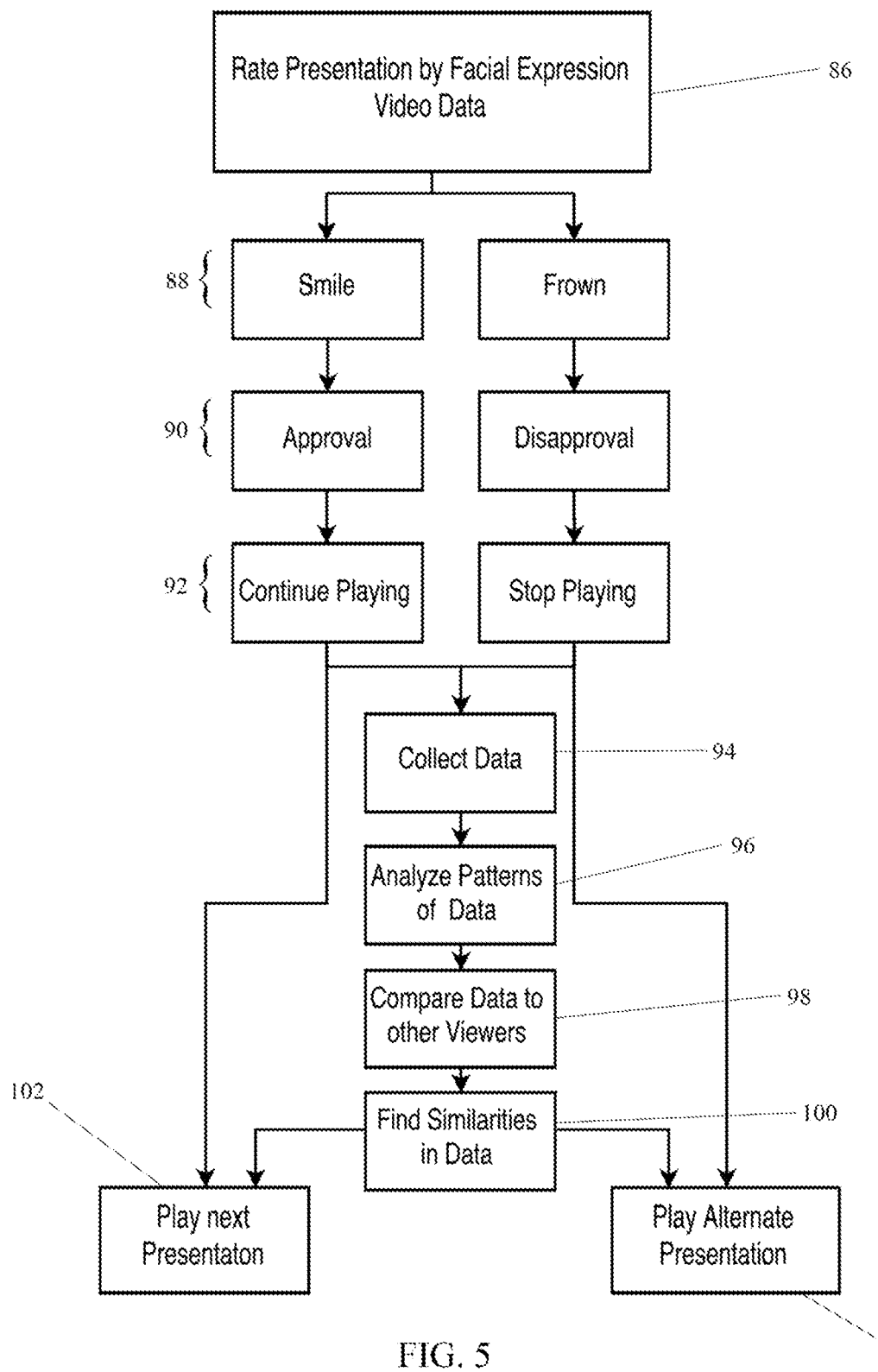
FIG. 5 schematically illustrates a graphical representation of categorizing a facial response as a method of hands-free user input.

Referring now to FIG. 5, this is a graphical representation of categorizing a facial response as user input. Once the media presentation has been played there is a simple conditional formula for determining whether the presentation should continue to play or whether a more suitable presentation should be played instead, as discussed above. As such, the presentation will be rated by intentional facial response video data 84. The viewer will be given the option of either smiling or frowning 86. A smile will be quantified with approval, and a frown with disapproval 88. As such, the video will continue playing for an approval response while it will stop playing and be changed for a disapproval 90. For approval, the next video can be played sequentially without further processing 102. Or, however, for either approval or disapproval, data can be collected and contrasted with a database of other viewers stored on either a remote computer server or cloud-based server 98. Those patterns of data such as viewer demographics and presentations being watched can be compared and contrasted in order to fine tune commercial programming 100. The data can be compared with other viewers 98 to find similarities and make recommendations based on similarities between the viewers, such as demographics and facial responses to the videos 100. The next presentation can then be customized to the viewer based on the findings 104 and the viewer can be prompted for an intentional facial response to view a recommendation or not 86.

The advantages of the present invention include, without limitation, no bodily movement or speech required of the viewer, whether it be a hand movement, gesture, voice, or determining a person's psychological affect or state of mind while playing targeted media presentations. The invention is also an alternate means for persons with physical and psychological disabilities to express either satisfaction or dissatisfaction with commercial programming.

The design of the current system allows a viewer to use facial responses in crowded public areas where video commercials are often times viewed as a "pastime." Unlike emotional affect or mental state systems that are designed for lengthy videos and which may be inaccurate in not taking into account confounding variables such as external environmental stimuli (such as a dog barking or someone speaking in the background), which are actually causing the viewer's facial responses, this system intentionally prompts the viewer to either frown, showing disapproval and thereby stop the media presentation, or smile, to continue viewing the presentation.

Figure 6:
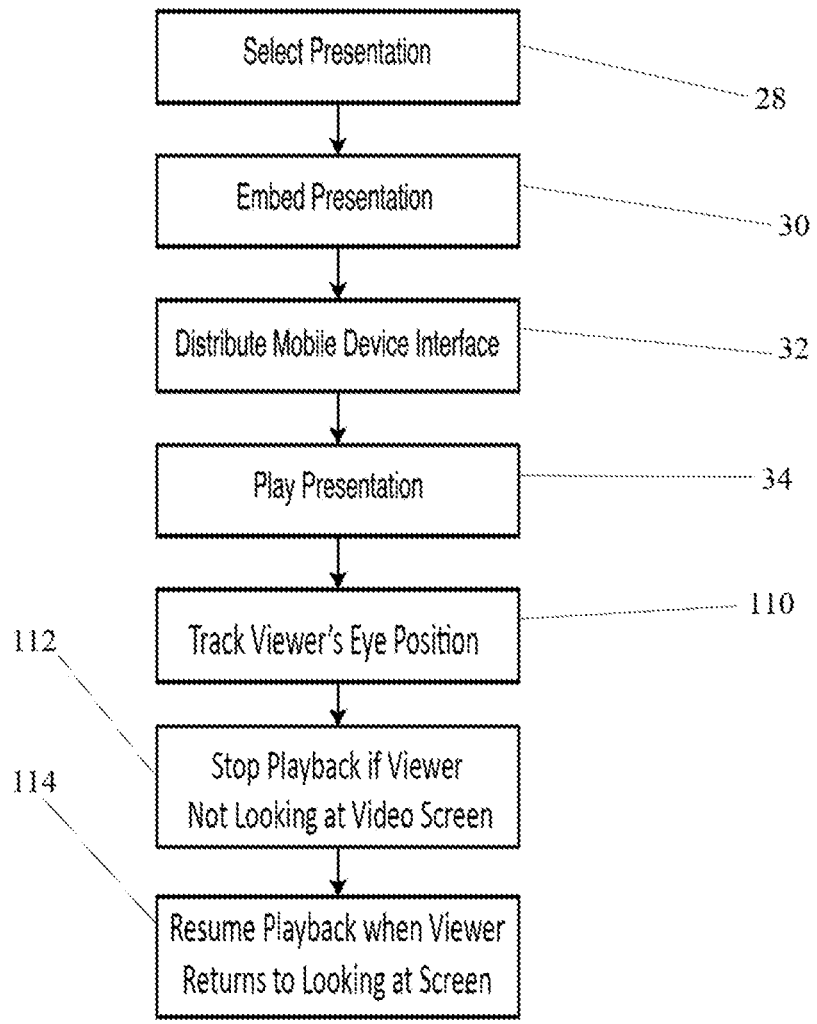
FIG. 6 schematically illustrates a flow diagram for displaying a media presentation based on viewer eye position.
Figure 7:
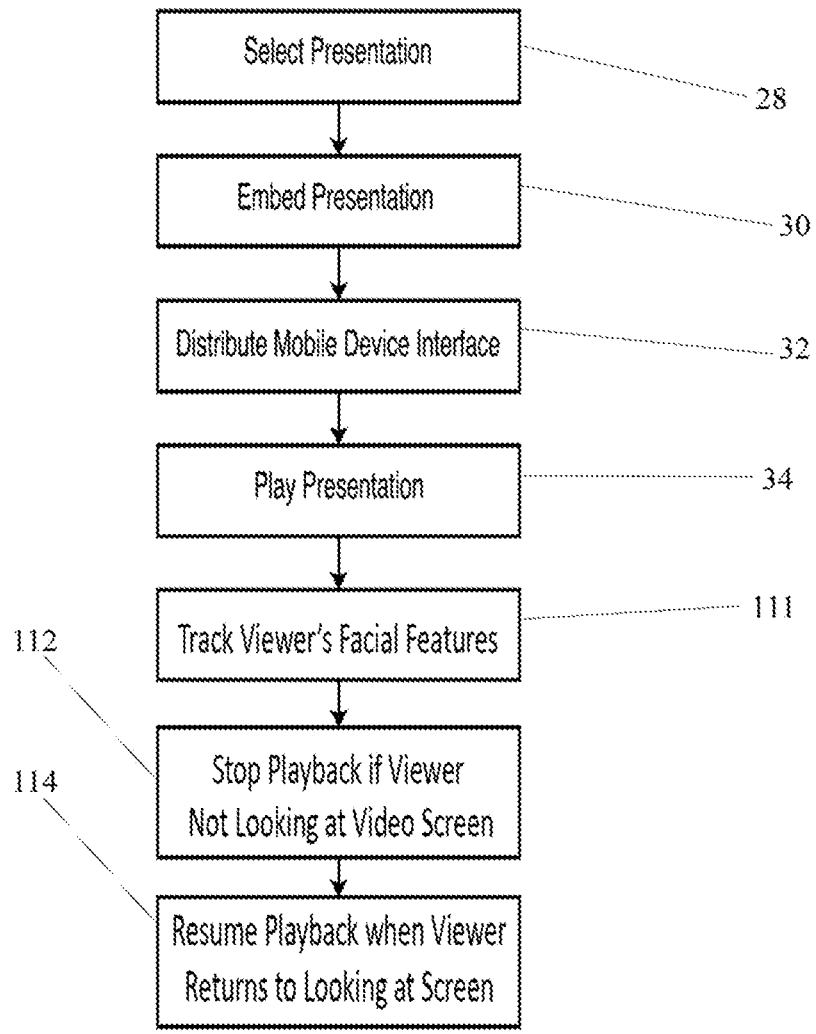
FIG. 7 schematically illustrates a flow diagram for displaying a media presentation based on viewer facial features.

FIGS. 6 and 7 schematically illustrate a flow diagram for displaying a media presentation based on viewer eye position or viewer facial features. In another embodiment of the present invention, the viewer may be prompted to begin a video presentation 28, and the facial recognition and eye-tracking equipment of the device may be attuned to track the user's eye position 110 or facial features 111 to ensure that the user is looking at the screen playing the video. Such a tracking may involve measuring the expected symmetry of the cheeks or relative positions of the eyes as compared to other facial landmarks, or any other means known in the art. The looking of the user at the video screen may permit the video to continue playback, while the looking away of the user from the video screen may cause the video playback to pause 112. The video playback may continue when the user resumes looking at the screen 114. Such a condition may ensure that a user is actually engaging the video being played, as opposed to starting the video and occupying themselves with another task. Within the present system such a feature may improve the accuracy of the results drawn from the prompted user responses, and may also ensure the delivery of advertising videos or educational videos to a user of the system.

Figure 8:
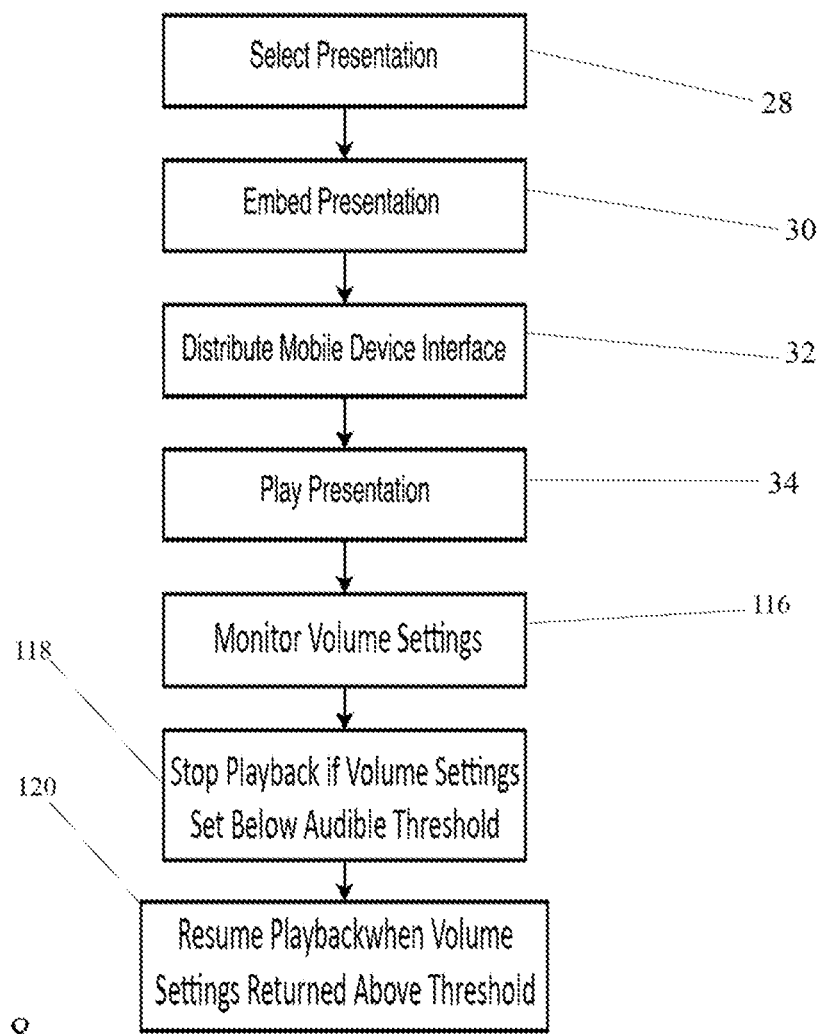
FIG. 8 schematically illustrates a flow diagram for displaying a media presentation based on volume settings.

FIG. 8 schematically illustrates a flow diagram for displaying a media presentation based on volume settings. In a second variation of such an embodiment, video playback may be correlated with the user-set volume 116, whereas if a user should reduce or mute the volume on a video the playback may automatically pause 118. The playback of the video may be resumed once the volume has returned to normal levels or has been unmuted 120.

In a third variation of such an embodiment, video playback may be correlated with the gyroscope built into the mobile device playing the video such that, if a user were to invert the mobile device video playback would pause automatically until the device is returned to an upright orientation.

Figure 9:
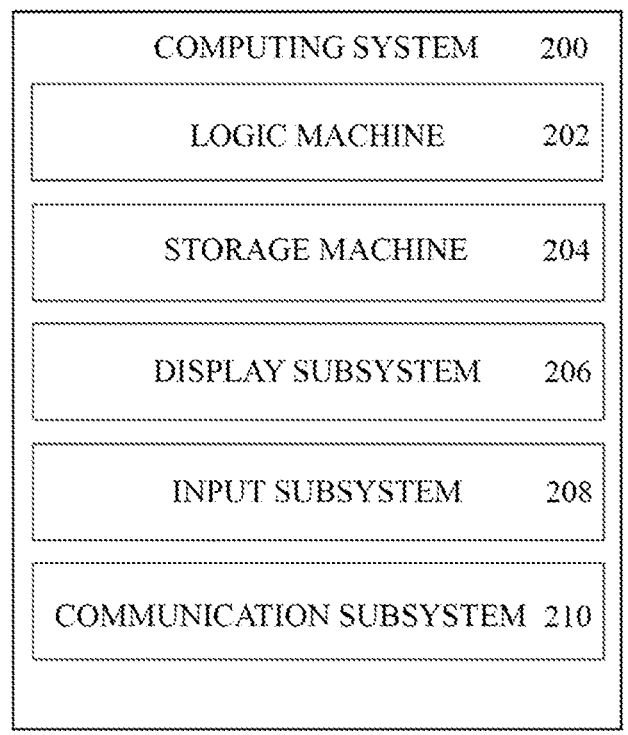
FIG. 9 schematically presents a computing system configured to carry out and actualize methods and tasks described herein.

FIG. 9 schematically presents a computing system that may represent an embodiment of the present invention. In some embodiments the method is executed on a computing system such as computing system 200 of FIG. 9. For example, storage machine 204 may hold instructions executable by logic machine 202 to provide the method to users. Display subsystem 206 may display the various elements of the method to participants. For example, display subsystem 206, storage machine 204, and logic machine 202 may be integrated such that the method may be executed while being displayed on a display screen. The input subsystem 208 may receive user input from participants to indicate the various choices or user inputs described above. The described method may be executed, provided or implemented to a user on one or more computing devices via a computer-program product such as via an application programming interface (API). FIG. 9 schematically shows a non-limiting exemplary embodiment of a computing system 200 that can enact the method described above. Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210. Logic machine 202 may execute machine-readable instructions via one or more physical devices. For example, the logic machine 202 may be configured to execute instructions to perform tasks for a computer program. The logic machine may include one or more processors to execute machine-readable instructions. Storage machine 204 includes one or more physical devices configured to hold or store instructions executable by the logic machine to implement the method. When such methods and processes are implemented, the state of storage machine 204 may be changed to hold different data. For example, storage machine 204 may include memory devices such as various hard disk drives or CD or DVD devices. Display subsystem 206 may visually present data stored on storage machine 204. For example, display subsystem 206 may visually present data to form a graphical user interface (GUI). Input subsystem 208 may be configured to connect and receive input from devices such as a mouse, keyboard, or gaming controller. Communication subsystem 210 may be configured to enable system 200 to communicate with other computing devices. Communication subsystem 210 may include wired and/or wireless communication devices to facilitate networked communication.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A method of controlling media presentations based on facial gestures, the method comprising:
    providing a mobile electronic device with a display screen, eye-tracking software, facial recognition software, a camera, and a media player, the facial recognition software operably configured to recognize a smile and a frown on a user's face with a user baseline;
    providing a central database communicatively coupled with the mobile electronic device and storing a plurality of media presentations and a plurality of user records resident thereon;
    publishing one of the plurality of media presentations through the media player on the display screen;
    confirming sight by the user of the one of the plurality of media presentations using eye-tracking software and, once sight by the user is confirmed, prompting the user through the display screen to elicit an intentional facial response of the user of either the smile and the frown on the user's face, the smile and the frown on the user's face associated with a user approval and a user disapproval, respectively, of the one of the plurality of media presentations;
    capturing, through the facial recognition software, the intentional facial response and communicating the intentional facial response to the central database for association with one of the plurality of user records resident thereon and to generate the user baseline;
    publishing another of the plurality of media presentations through the media player on the display screen and, after initial publication of the another of the plurality of media presentations and during publication of the another of the plurality of media presentations through the media player on the display screen, prompting the user through the display screen to elicit another intentional facial response of the user of either the smile and the frown on the user's face;
    capturing, through the facial recognition software, the another intentional facial response of the user and communicating the another intentional facial response to the central database for ascertaining the user approval or the user disapproval using the user baseline; and
    removing or maintaining the publication of the another of the plurality media presentations with the user approval or the user disapproval, respectively, of the another intentional facial response of the user.

2. The method according to claim 1, further comprising:
    if the sight by the user is not confirmed after one of the plurality of media presentations is published, do not prompt the user through the display screen to elicit an intentional facial response of the user of either the smile and the frown on the user's face.

3. The method according to claim 1, further comprising:
    after confirming sight by the user of the one of the plurality of media presentations using eye-tracking software, measuring ambient lighting around the camera of the mobile electronic device and, if unable to capture the intentional facial response through the facial recognition software because of insufficient ambient lighting around the camera of the mobile electronic device, increasing the brightness of the display screen on the mobile electronic device.

* * * * *